United States Patent [19]
Was

[11] 3,831,671
[45] Aug. 27, 1974

[54] TRANSMISSION FLUID HEAT EXCHANGER IN A MOTOR VEHICLE COOLING SYSTEM

[75] Inventor: Wilfred L. Was, Dearborn, Mich.

[73] Assignee: Ford Motor Company, Dearborn, Mich.

[22] Filed: Feb. 28, 1972

[21] Appl. No.: 229,899

[52] U.S. Cl............ 165/154, 123/41.33, 184/104 B
[51] Int. Cl. ............................................. F28g 13/00
[58] Field of Search.............. 123/41.33; 184/104 B; 165/140, 154

[56] References Cited
UNITED STATES PATENTS

| | | | |
|---|---|---|---|
| 2,054,403 | 9/1936 | Yeager | 165/140 X |
| 2,698,162 | 12/1954 | Riesgo | 165/154 |
| 2,990,163 | 6/1961 | Farrell | 165/154 |
| 3,318,375 | 6/1967 | Linder et al. | 165/164 |
| 3,346,042 | 10/1967 | Seehausen | 165/154 |
| 3,732,921 | 5/1973 | Hilicki et al. | 165/54 |

FOREIGN PATENTS OR APPLICATIONS

| 977,579 | 1964 | Great Britain | 165/140 |
|---|---|---|---|

Primary Examiner—Albert W. Davis, Jr.
Assistant Examiner—Sheldon J. Richter
Attorney, Agent, or Firm—Keith L. Zerschling; Robert W. Brown

[57] ABSTRACT

A heat exchanger for cooling transmission fluid of a motor vehicle having a liquid-cooled internal combustion engine and a fluid controlled or operated transmission. The transmission fluid heat exchanger is used in conjunction with the cooling system used to transfer to the atmosphere heat from the liquid used for cooling the internal combustion engine. The transmission fluid heat exchanger preferably is positioned in a tank of a radiator for the purpose of transferring heat from the transmission fluid passing through the heat exchanger to the liquid used for cooling the internal combustion engine. The transmission fluid heat exchanger includes an inlet orifice and an outlet orifice and means for causing the transmission fluid entering the inlet orifice of the heat exchanger to flow initially in a direction away from the outlet orifice and then in a direction toward the outlet orifice.

4 Claims, 7 Drawing Figures

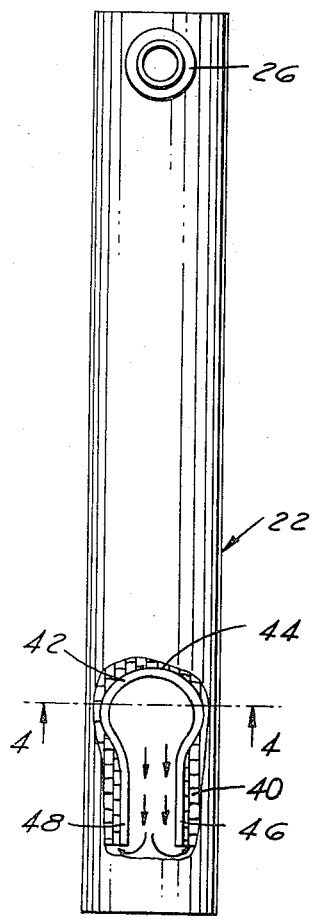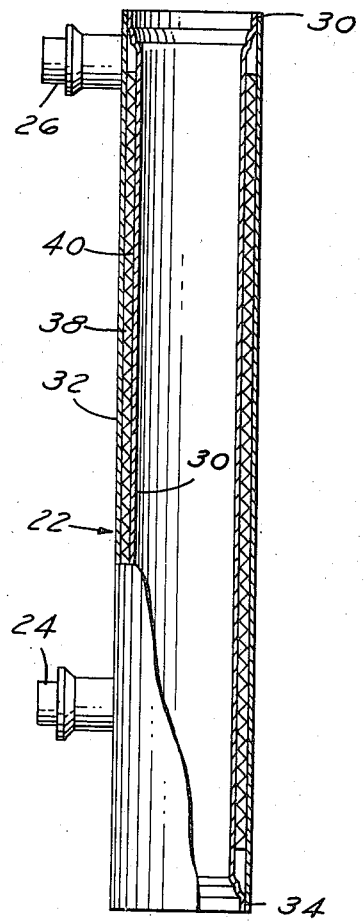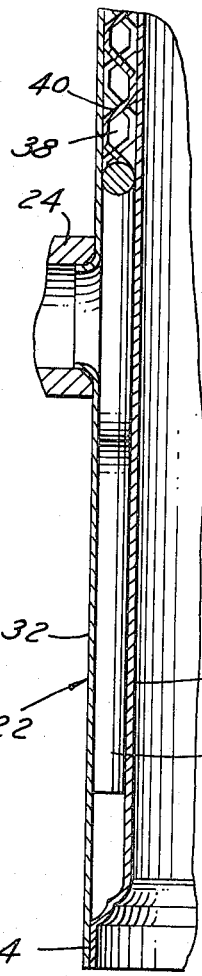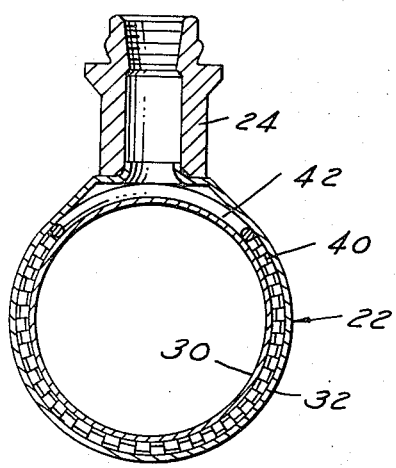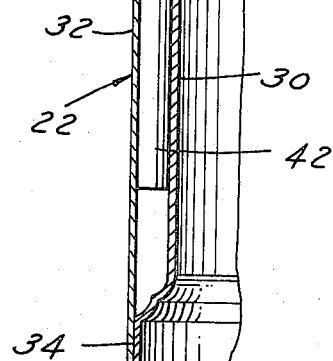

TRANSMISSION FLUID HEAT EXCHANGER IN A MOTOR VEHICLE COOLING SYSTEM

BACKGROUND OF THE INVENTION

This invention relates to a cooling system for a motor vehicle having a liquid-cooled internal combustion engine and having a transmission which utilizes a fluid in its operation or for its control. More particularly, the invention relates to a transmission fluid heat exchanger which may be used in conjunction with the cooling system for the internal combustion engine.

In present day motor vehicles which utilize a fluid-operated transmission intermediate the output shaft of the engine and the drive wheels of the vehicle, it is necessary to provide cooling apparatus for the transmission fluid. In motor vehicles that employ a liquid-cooled internal combustion engine, a radiator is used to transfer to the atmosphere heat absorbed by a liquid coolant that is circulated through the internal combustion engine. Moreover, it has become common practice to position a transmission fluid heat exchanger, through which the transmission fluid is caused to flow, within the radiator for the purpose of transferring heat from this transmission fluid to the liquid used to cool the internal combustion engine.

In recent years, the burden on the transmissions used in motor vehicles has been increased considerably. For example, extensive use of camping trailers and boat trailers towed by motor vehicles has come into being. Motor vehicles are required to tow these trailers on super highways at high speeds and also through mountainous regions. This type of service can lead to transmission failure if the transmission fluid is inadequately cooled. Thus, a need has arisen to increase the cooling capacity of the transmission fluid heat exchanger employed in such vehicles.

Transmission fluid heat exchangers have over the years taken a variety of configurations. The assignee of the present invention has made extensive use of a transmission fluid heat exchanger having a cylindrical form, but other designs may also be used, as is exemplified by the spiral heat exchanger shown in U.S. Pat. No. 3,486,489 granted to H. D. Huggins. A common feature of these various heat exchanger designs is that they are intended for use in the radiator of a motor vehicle having a liquid-cooled internal combustion engine. Such heat exchangers necessarily include a flow chamber having an inlet orifice for receiving transmission fluid and an outlet orifice, spaced from the inlet orifice, for returning fluid to the transmission of the vehicle. Transmission fluid enters the heat exchanger through the inlet orifice, flows along the flow chamber to the outlet orifice, and is returned to the transmission. During its passage through the heat exchanger, heat is transferred from the transmission fluid to the liquid coolant in the motor vehicle radiator.

The heat transfer capacity of a transmission fluid heat exchanger may be increased by increasing the length of the flow chamber or passage extending between the heat exchanger inlet orifice and outlet orifice. However, where different vehicles have different heat exchanger requirements but utilize common radiator components, it is desirable to use a common spacing distance between inlet and outlet orifices of the various size heat exchangers. This permits the use of transmission fluid exchangers of a variety of capacities without change in the structure of radiator components or the feed and return lines leading to the heat exchanger from the transmission of the vehicle. Moreover, because radiators are limited in size for a given vehicle, the spacing of the inlet and outlet orifices of the transmission fluid heat exchanger in many cases cannot be increased without deleteriously affecting the functional performance of the radiator in cooling the liquid circulated through the internal combustion engine. This is particularly true with respect to radiators of the cross-flow type.

SUMMARY OF THE INVENTION

The invention is concerned with a transmission fluid heat exchanger that is incorporated into the overall cooling system of a motor vehicle. The motor vehicle has a liquid-cooled internal combustion engine and has a transmission, which utilizes a fluid in its operation, connected to the engine. The cooling system for the motor vehicle may comprise a radiator having a first tank for receiving heated liquid from the internal combustion engine and a second tank for supplying cooled liquid to the internal combustion engine. The first and second tanks are spaced from one another and their interiors are interconnected by heat exchanger flow passages through which the heated liquid coolant received in the first tank flows to the second tank. This results in heat transfer from the liquid coolant to the atmosphere.

The transmission fluid heat exchanger of the invention is positioned in the second tank of the radiator and has an inlet orifice for receiving fluid from the vehicle's transmission and an outlet orifice, spaced from the inlet orifice for returning the fluid to the transmission.

Preferably, the transmission fluid heat exchanger comprises a pair of coaxially positioned cylinders of substantially equal length. One of the cylinders has a larger diameter than the other, and the cylinders are sealed at their ends to form a chamber which is utilized as a flow passage for the transmission fluid. The inlet and outlet orifices are in communication with the chamber and are in locations axially spaced from one another along the length of the cylinders. Means are provided to cause the transmission fluid entering the chamber through the inlet orifice to flow in an axial direction away from the outlet orifice and then in an axially opposite direction toward the outlet orifice. This means may comprise a generally U-shaped member, such as a U-shaped wire or U-shaped protrusion formed in one of the cylinders. Alternatively, the flow passage between the cylinders may include a turbulator inserted within it, and the turbulator may have a U-shaped part which causes the transmission fluid to flow initially away from the outlet orifice and then in an axially opposite direction toward it.

BRIEF DESCRIPTION OF THE DRAWINGS

FIG. 2 is an elevational view with parts broken away of a transmission fluid heat exchanger;

FIG. 3 is a plan view of the heat exchanger of FIG. 2;

FIG. 4 is a sectional view of the heat exchanger of FIGS. 2 and 3, the section being taken along the line 4—4 of FIG. 3;

FIG. 5 is an enlarged sectional view of the inlet end of the heat exchanger of FIGS. 2 through 4;

DETAILED DESCRIPTION

Figure 1:
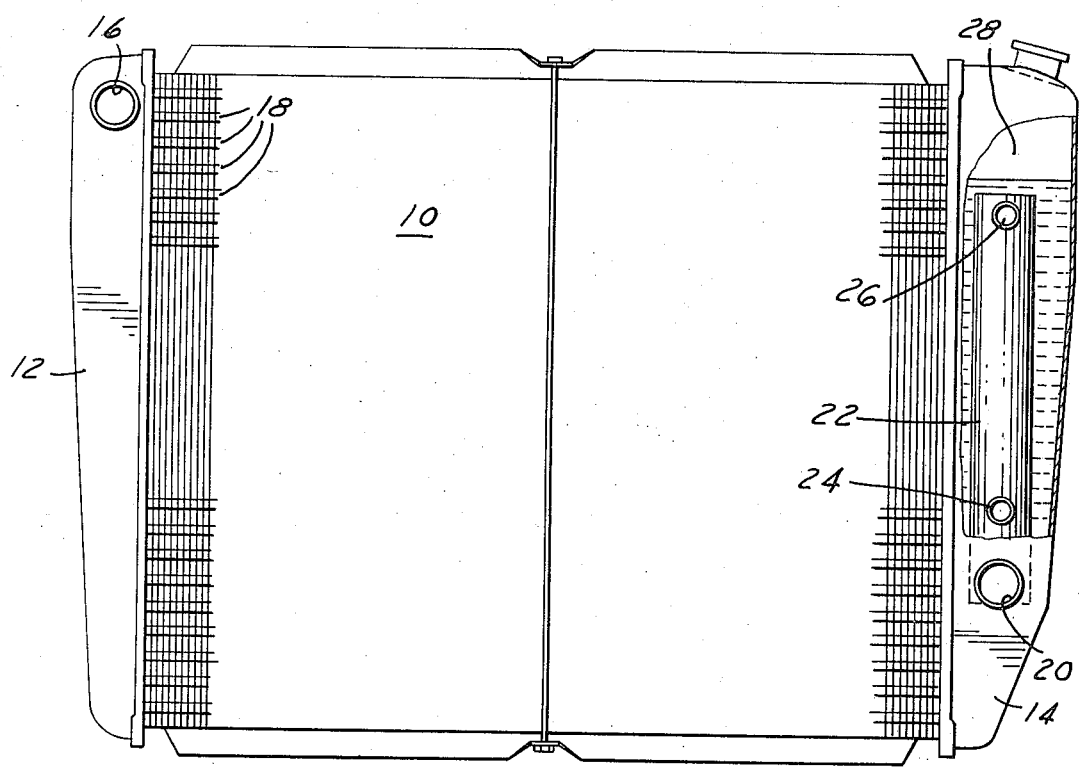
FIG. 1 is a somewhat diagrammatical elevational view, with parts broken away, of a cross-flow radiator having a transmission fluid heat exchanger incorporated therein.

With reference now to the drawings, wherein like numerals refer to like parts, and in particular to FIG. 1, there is shown a cross-flow radiator 10 typical of those used in the cooling system for a liquid-cooled internal combustion engine.

The radiator 10 has a first tank 12 having an inlet opening 16 for receiving liquid from the internal combustion engine (not shown). A second tank 14 is positioned on the side of the cross-flow radiator 10 opposite the first tank 12. A plurality of heat exchanger flow passages 18 interconnect the interiors of the tanks 12 and 14. Thus, liquid coolant enters the first tank 12 through the inlet opening 16 and then flows through the flow passages 18 to the second tank 14. During the course of its passage through the flow passages 18, the liquid coolant for the internal combustion is cooled and heat is transferred from it to the atmosphere. The liquid coolant that enters the second tank 14 is discharged therefrom through an opening 20 and is returned to the internal combustion engine.

A transmission fluid heat exchanger 22 is positioned within the second tank 14. The heat exchanger 22 has an inlet orifice formed by a conduit 24, which passes from the interior of the second tank 14 to the exterior thereof. Similarly, an outlet orifice is formed by a conduit 26 that is spaced from the inlet conduit 24 and which passes from the interior of the second tank 14 to its exterior. When in use, the inlet orifice 24 and the outlet orifice 26 are connected with tubing or the like to the vehicle's transmission such that transmission fluid may be supplied to the inlet orifice 24 and returned to the transmission through the outlet orifice 26. A flow passage in the heat exchanger 22 exists between the inlet and outlet orifices, and, as the transmission fluid passes through the heat exchanger, heat is transferred from the transmission fluid to the liquid coolant in the second tank 14.

Because the materials used to make transmission fluid heat exchangers is expensive, it is desirable to use the smallest size suitable for a given application. However, if as in the prior art, the spacing between the orifices 24 and 26 were to be different for each heat exchanger length used, then likewise the tank 14 that accommodates them would also have to be different for each length because the conduits forming the orifices pass through the tank. This is an obvious disadvantage of the prior art. Also, it may be seen in FIG. 1 that the upper portion 28 of the tank 14 is devoid of liquid. This is characteristic in cross-flow radiators and results from the discharge of the coolant through the opening 20. Therefore, it may be appreciated that the length of the heat exchanger 22 in the upward direction can not be increased beyond that shown without causing the heat exchanger to extend out of the coolant liquid. Furthermore, it may be appreciated that the inlet conduit 24 can not be spaced a substantially greater distance from the outlet conduit 26 without creating a flow interference with respect to the liquid coolant being discharged through the opening 20.

The present invention provides means whereby the overall length and heat transfer capacity of the heat exchanger 22 may be increased without increasing the spacing between the inlet conduit 24 and the outlet conduit 26.

With reference now in particular to FIGS. 2 through 5, there is shown a transmission fluid heat exchanger 22 constructed in accordance with the invention. Transmission fluid heat exchanger 22 comprises a pair of coaxially positioned cylinders 30 and 32 of different diameters, but substantially equal in length. The inner cylinder 30 and the larger diameter outer cylinder 32 are sealed together at their ends 34 and 36, thereby, to form a flow chamber or passage 38 between them. Preferably, the heat exchanger is made from brass and the seals 34 and 36 are made fluid tight by soldering of the joints between the inner and outer cylinders.

The inlet orifice 34 communicates with the flow chamber 38 as does the outlet orifice 26, which is axially spaced from the inlet orifice along the length of the cylinders 30 and 32.

Preferably, a turbulator 40 is positioned within the flow passage or chamber 38. The turbulator 40 may be made from a cylindrically-shaped piece of expanded metal, the details of which may best be seen in FIG. 5. As the name implies, the function of the turbulator 40 is to create turbulance within the transmission fluid as it flows from the inlet orifice 24 to the outlet orifice 26. Such turbulance creates a scrubbing action of the fluid against the surfaces of the cylinders 30 and 32 to increase the heat transfer from the fluid to the liquid coolant surrounding the heat exchanger. When the heat exchanger 22 is positioned within the second radiator tank 14, the liquid coolant is in contact with the exterior surfaces of the cylinders 30 and 32.

In accordance with the invention, means are provided for causing transmission fluid which enters the heat exchanger 22 through the inlet orifice 24 to flow initially in a direction away from the outlet orifice 26 and then in a direction toward it. In the embodiment of the invention shown in FIGS. 2 through 5, this may be accomplished through the use of a generally U-shaped member positioned within the flow chamber 38. The term "U-shaped member" as used herein refers to a device which is curved back upon itself substantially in the shape of a U so that it acquires a closed end and an open end. The closed end of the U-shaped member is positioned around the inlet orifice 24 and the legs of the U-shaped member extend in a direction away from both the inlet orifice and the outlet orifice.

In FIGS. 2 through 5, the U-shaped member comprises a substantially U-shaped wire 42 positioned within the flow passage 38 of the heat exchanger 22. The U-shaped wire 42 has its closed end 44 positioned around the inlet orifice 24, as may best be seen in FIGS. 3 and 5, and has its legs 46 and 48 extending in a direction away from both the inlet orifice 24 and the outlet orifice 26. The legs 46 and 48 of the U-shaped wire 42 terminate short of the sealed end 34 of the heat exchanger 22. The U-shaped member is in contact with both the radially outer surface of the inner cylinder 30 and with the radially inner surface of the outer cylinder 32. Thus, when transmission fluid enters the heat exchanger 22 through the inlet orifice 24 it is constrained to flow in an axial direction away from both the inlet and outlet orifices until it arrives at the ends of the legs 46 and 48 of the U-shaped member 42, and then this fluid flows in the axially opposite direction on the outer portion of the U-shaped member 42 and through the flow passage 38 to the outlet orifice 26. Thus, the transmission fluid is constrained to flow from the inlet orifice in an axial direction away from the outlet orifice 26 and then in the axially opposite direction toward the outlet orifice 26.

Figure 6:
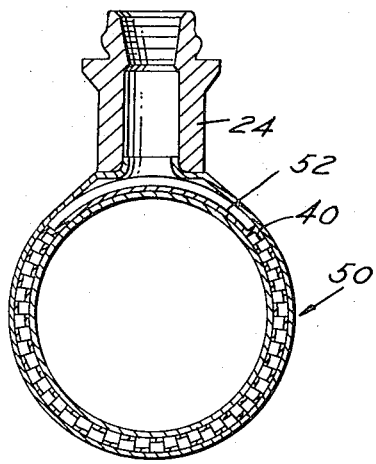
FIG. 6 is a sectional view of another embodiment of a transmission fluid heat exchanger.

With reference now to FIG. 6, there is shown a sectional view of a cylindrically-shaped transmission fluid heat exchanger 50. The heat exchanger 50 of FIG. 6 differs from that of FIGS. 2 through 5 in that the U-shaped member is formed as a part 52 of the turbulator 40. In other words, the U-shaped barrier which has its closed end surrounding the inlet orifice 24 and its legs extending away from the outlet orifice is formed as an integral part of the turbulator 40. The U-shaped configuration 52 may be formed in the turbulator 40, with a suitable stamping die or the like, during the course of its manufacture.

Figure 7:
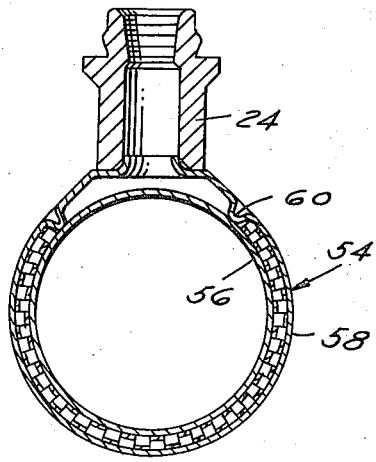
FIG. 7 is a sectional view of still another embodiment of a transmission fluid heat exchanger.

With reference now to FIG. 7, there is shown a sectional view of a transmission fluid heat exchanger 54 having an inner cylinder 56 and an outer cylinder 58. In the heat exchanger 54, the U-shaped member, which causes the transmission fluid to enter the inlet orifice 24 and flow in a direction away from the outlet orifice and then in a direction toward the outlet orifice, is in the form of a radially inwardly extending protrusion 60 that is formed in a U-shaped configuration in the outer cylinder 58. Alternatively, a U-shaped protrusion extending radially outwardly could be formed in the inner cylinder 56.

From the detailed description above, it may be appreciated that transmission fluid heat exchangers of varying lengths and heat transfer capacities, but with fixed spacing between inlet and outlet orifices, may be constructed. More specifically, the length of the heat exchanger may be increased without a change in the spacing of the inlet and outlet orifices, and means may be positioned within the heat exchanger to cause transmission fluid entering therein through its inlet orifice to flow in a direction away from the outlet orifice and then in a direction toward it. Morever, the invention need not be limited to cylindrically-shaped heat exchangers as described in detail above, but may also be applied to heat exchangers of other designs, such as the spiral heat exchanger design depicted in the aforementioned U.S. Pat. No. 3,486,489.

Based upon the foregoing description of the invention, what is claimed and desired to be protected by Letters Patent is:

1. A transmission fluid heat exchanger which comprises: a first cylinder; a second cylinder coaxially positioned with respect to said first cylinder and of larger diameter than said first cylinder, said second cylinder having inlet and outlet orifices spaced from one another along the length of said second cylinder, said first and second cylinders having their ends sealed together to form a closed chamber between them; and a U-shaped member positioned within said chamber and extending between said first and second cylinders for constraining fluid entering therein through said inlet orifice to flow in an axial direction away from said outlet orifice and then in an axial direction toward said outlet orifice, the closed portion of said U-shaped member being positioned around said inlet orifice and the legs of said U-shaped member extending in a direction away from said outlet orifice.

2. A transmission fluid heat exchanger in accordance with claim 1, wherein said member is a U-shaped wire, said wire being positioned in sealing engagement with both the radially outer surface of said first cylinder and the radially inner surface of said second cylinder.

3. A transmission fluid heat exchanger in accordance with claim 1, wherein said U-shaped member is integral with said second cylinder and comprises a radially extending protuberance formed in one of said cylinders.

4. A transmission fluid heat exchanger in accordance with claim 1, which further includes a turbulator positioned within said chamber, said U-shaped member being an integral part of said turbulator.

* * * * *